United States Patent [19]

Lipman

[11] Patent Number: 4,975,822

[45] Date of Patent: Dec. 4, 1990

[54] HARMONIC REDUCTION FOR MULTI-BRIDGE CONVERTERS

[75] Inventor: Kenneth Lipman, West Hartford, Conn.

[73] Assignee: International Fuel Cells Corporation, South Windsor, Conn.

[21] Appl. No.: 354,448

[22] Filed: May 19, 1989

[51] Int. Cl.$^5$ ............................................. H02M 1/12
[52] U.S. Cl. ....................................... 363/40; 363/42; 363/72
[58] Field of Search ....................... 363/40, 43, 71, 64, 363/72

[56] References Cited

U.S. PATENT DOCUMENTS

| | | | |
|---|---|---|---|
| 3,792,286 | 2/1974 | Meier | 363/71 |
| 3,876,923 | 4/1975 | Humphrey et al. | 363/71 |
| 4,204,264 | 5/1980 | Lipman | 363/40 |

Primary Examiner—William H. Beha, Jr.
Attorney, Agent, or Firm—McCormick, Paulding & Huber

[57] ABSTRACT

A method for reducing the signal harmonics of the output fundamental signals of a three-phase inverter systems made up of an N number of inverter bridges achieves harmonic signal reduction by combining the outputs of immediately adjacent bridges separated by 60°/N relative to one another and then summing the combined sum signal with the outputs of the next immediately adjacent bridge.

1 Claim, 14 Drawing Sheets

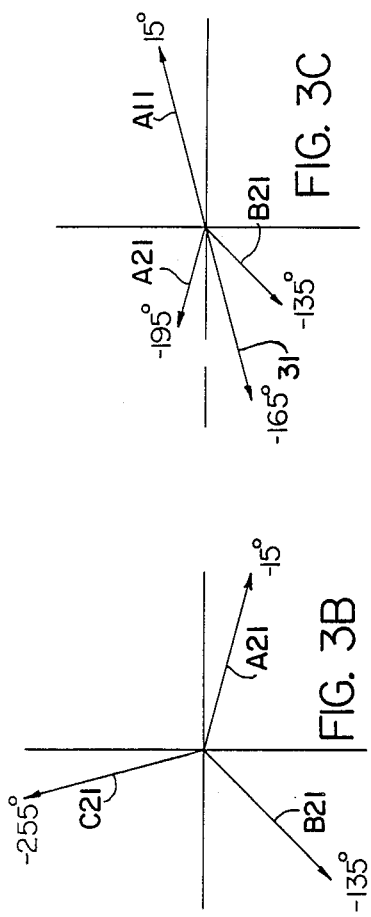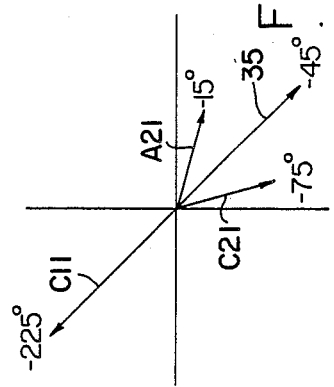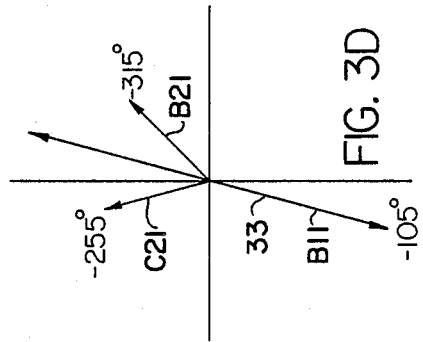
FIG. 3A  FIG. 3B  FIG. 3C  FIG. 3D  FIG. 3E

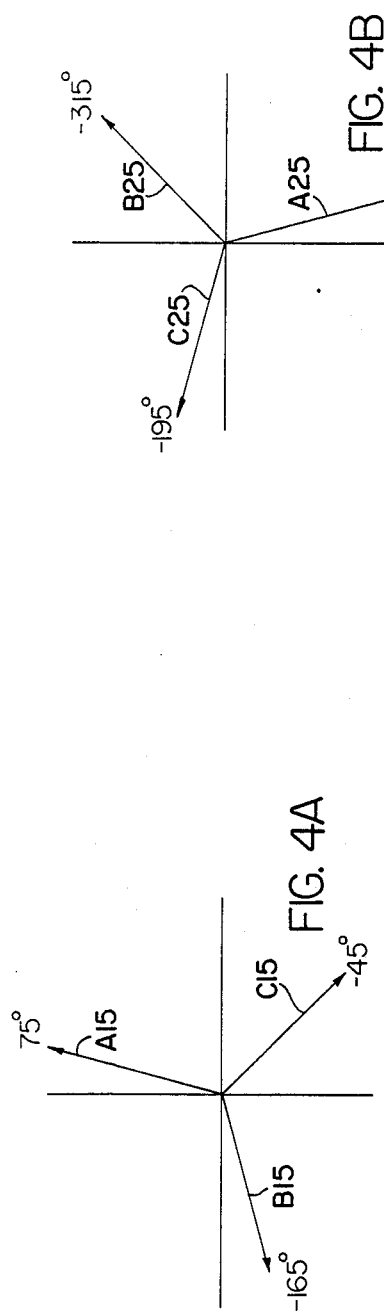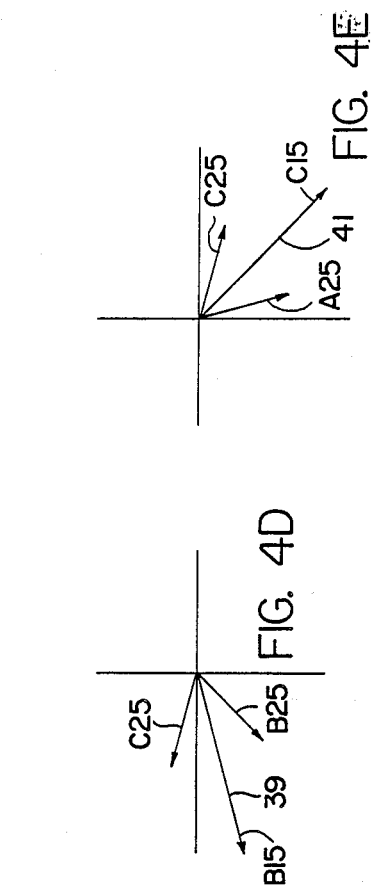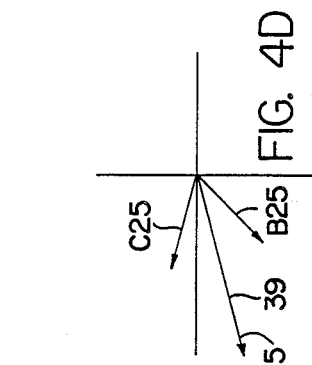

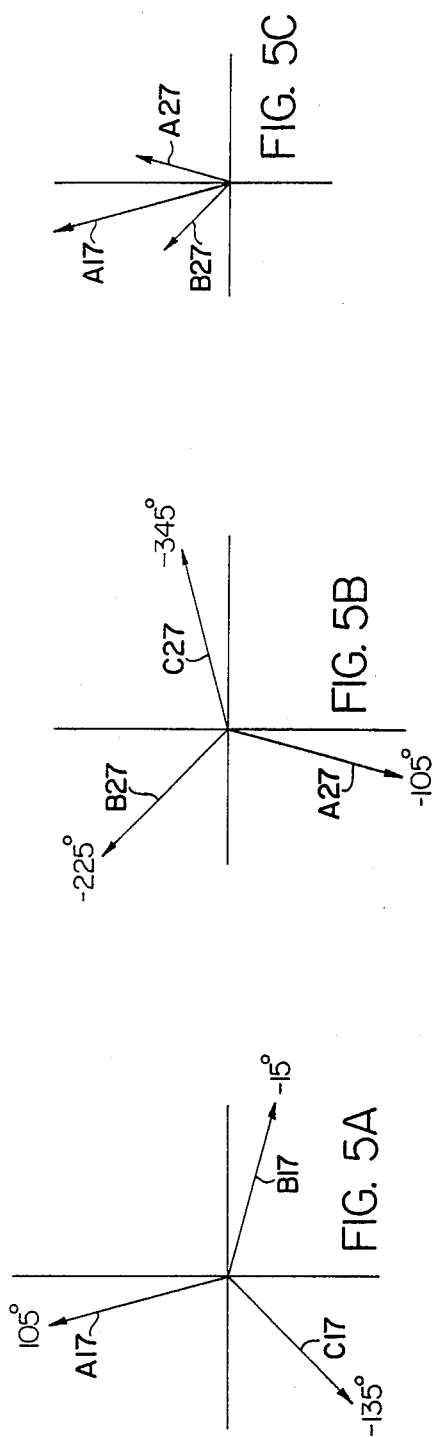

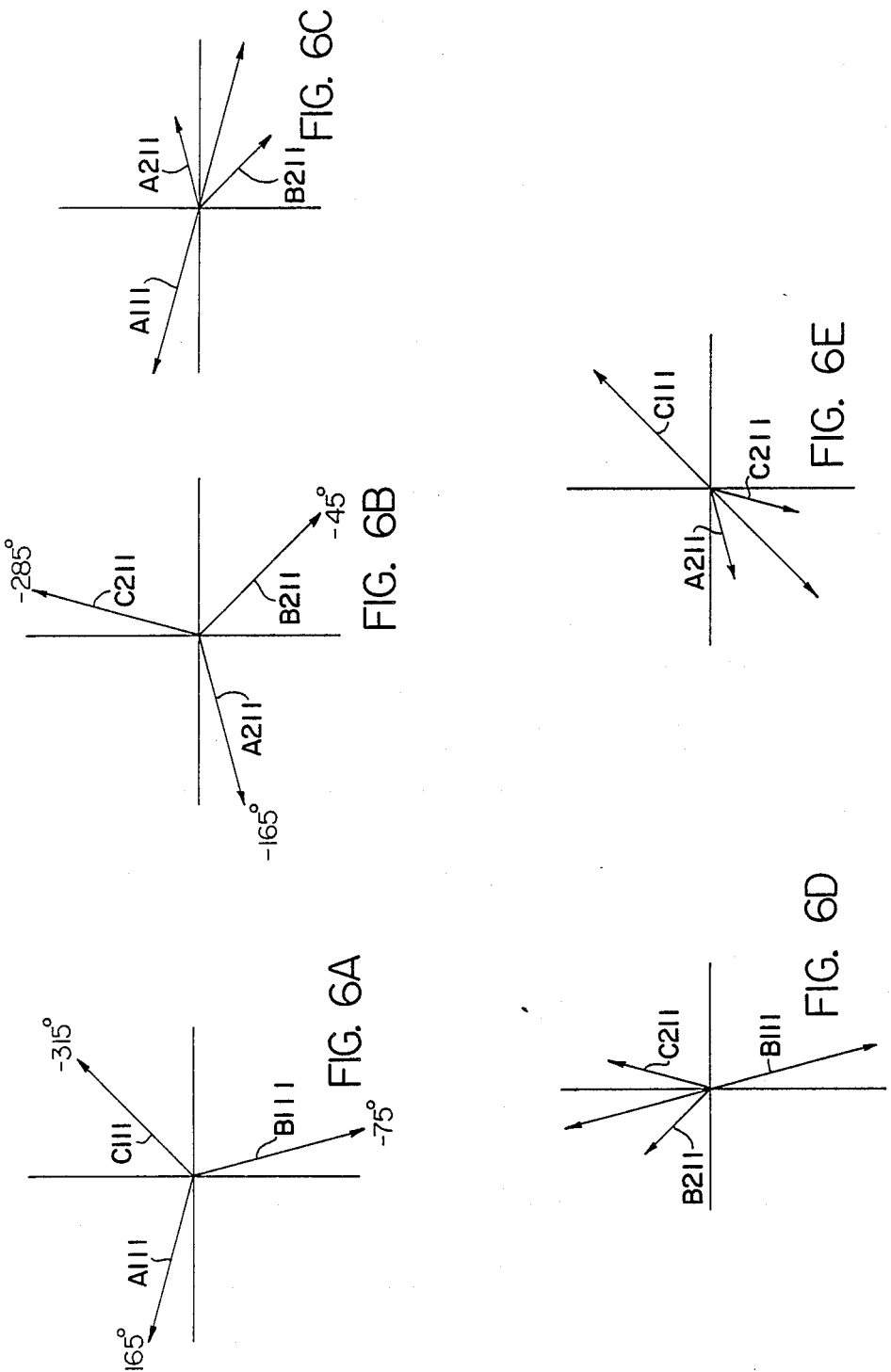

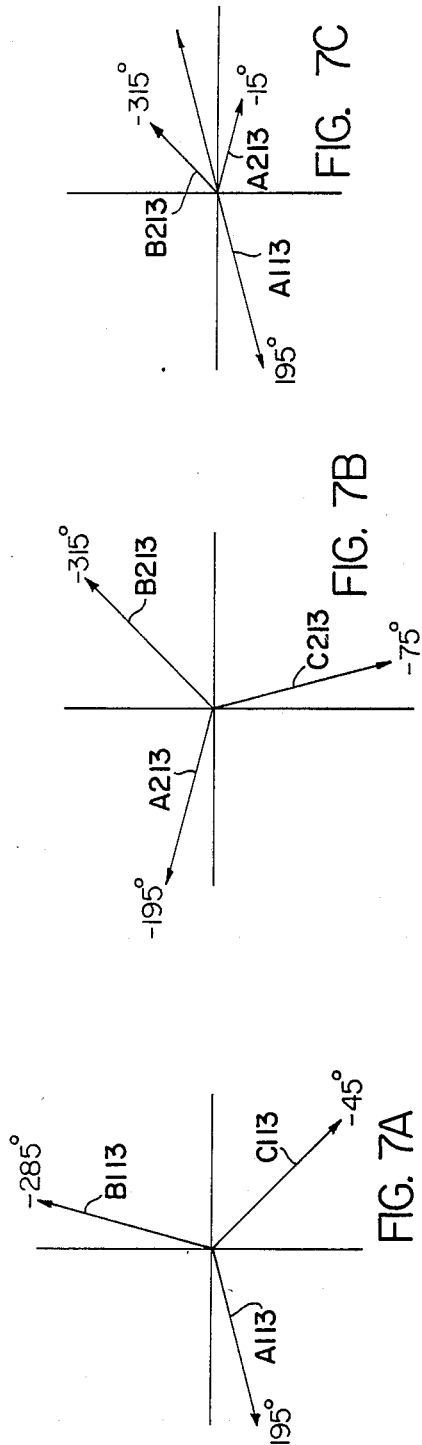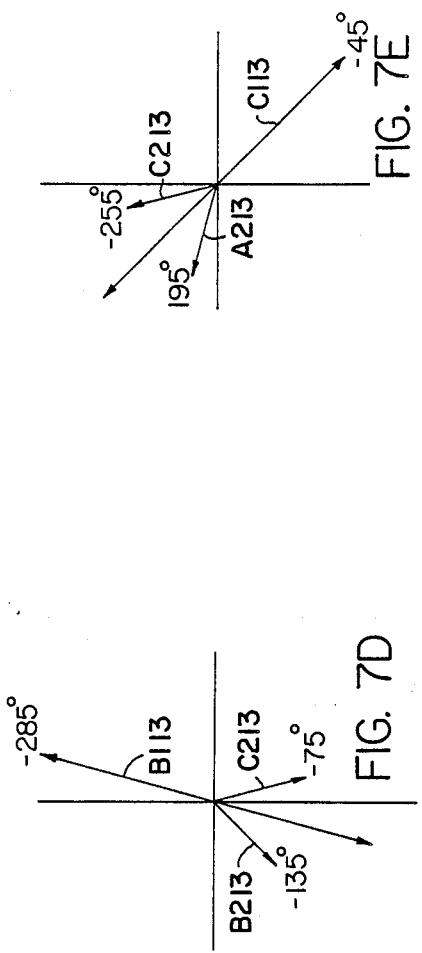

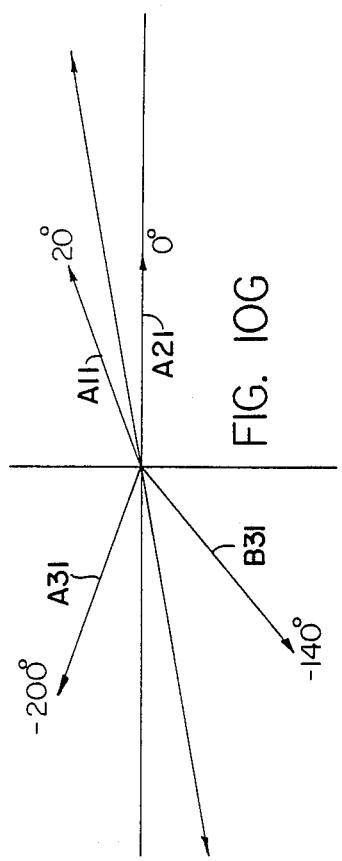
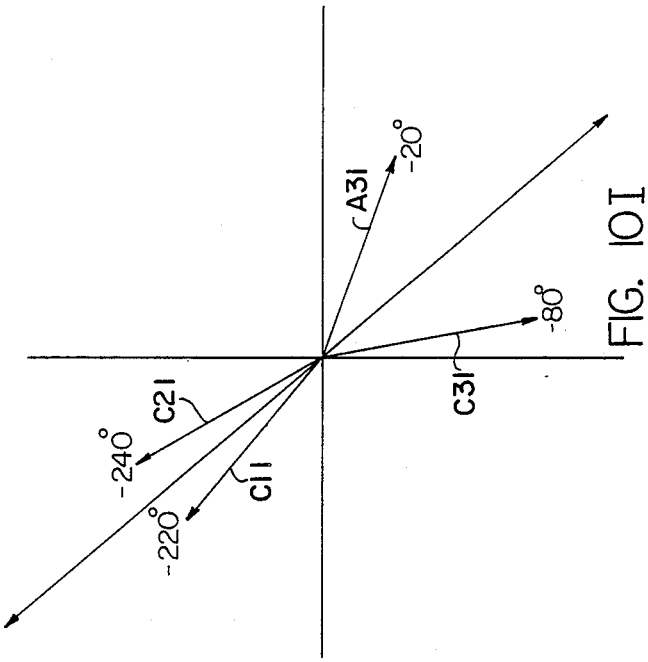
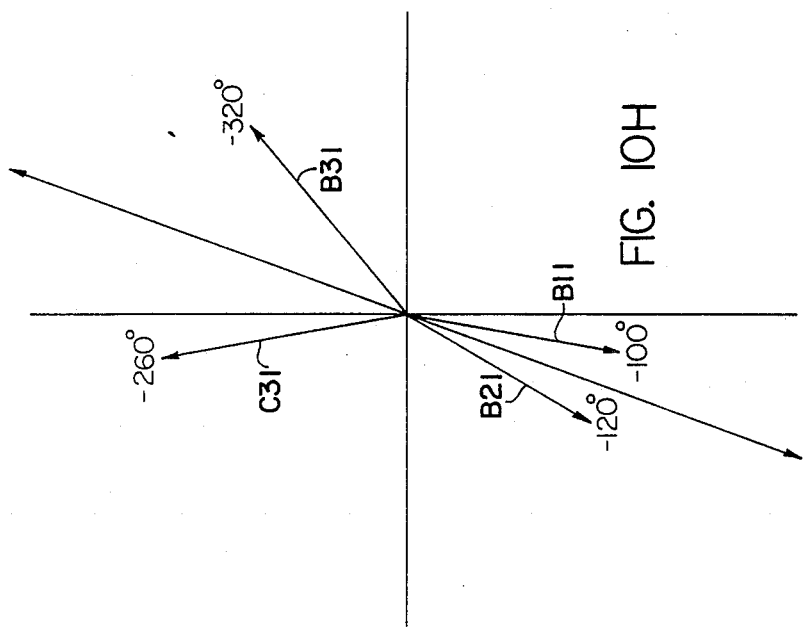

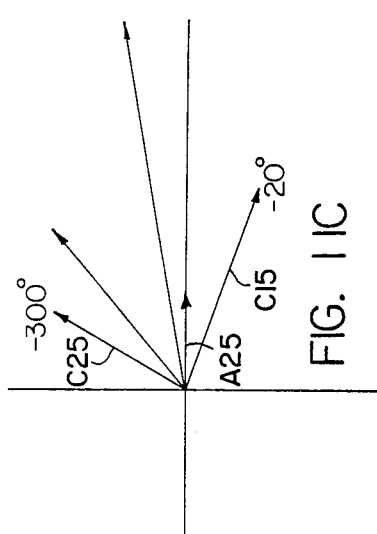
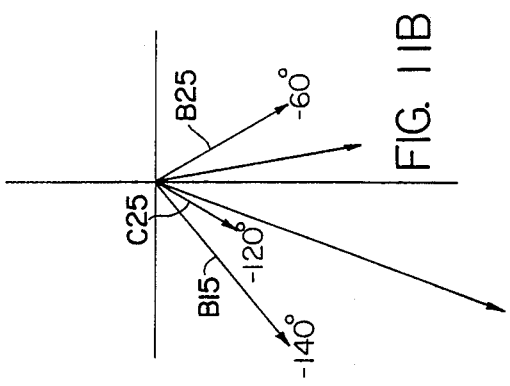
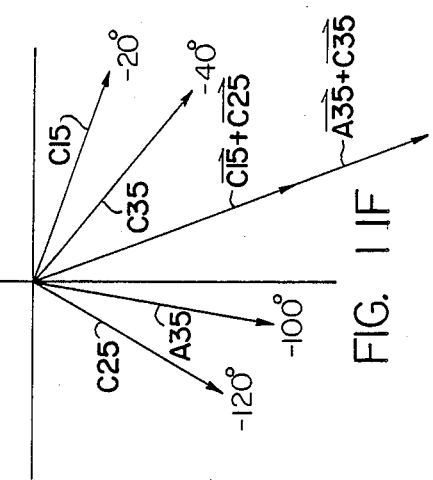
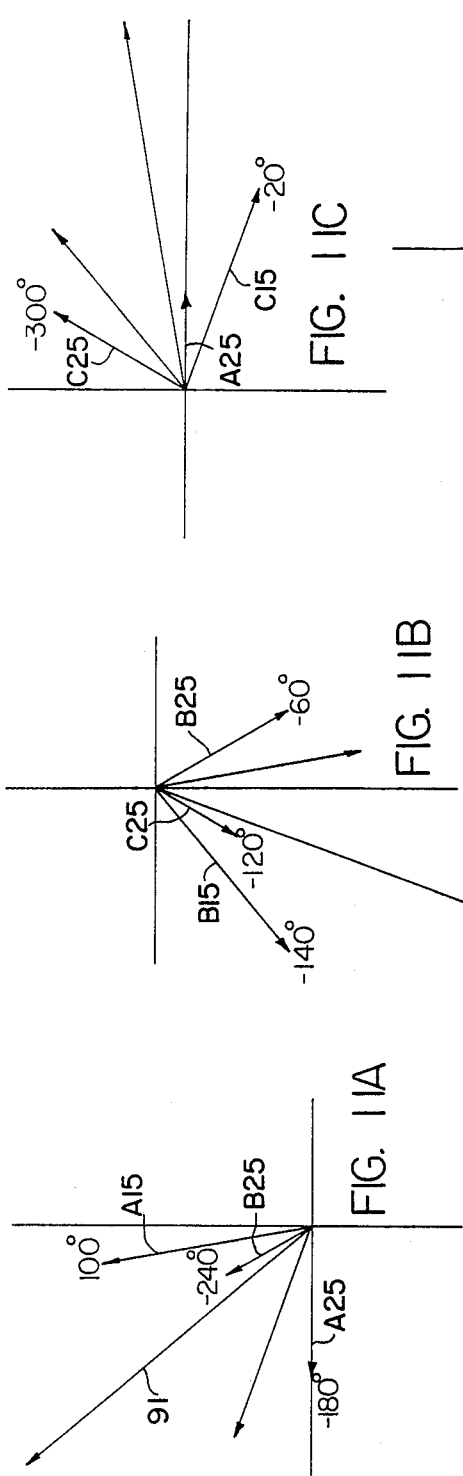
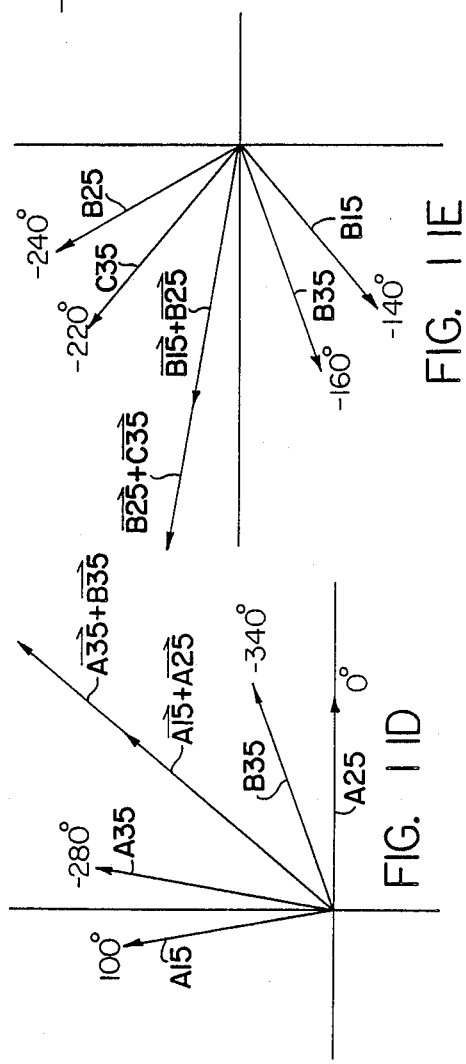

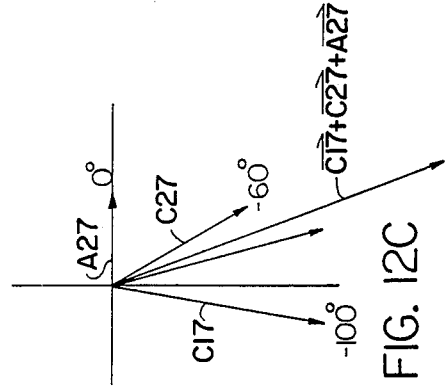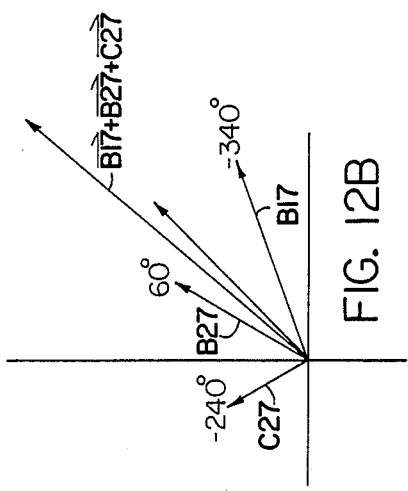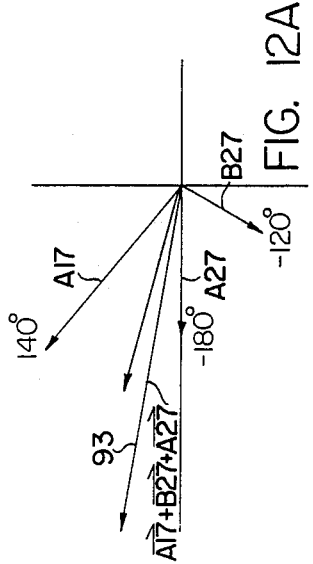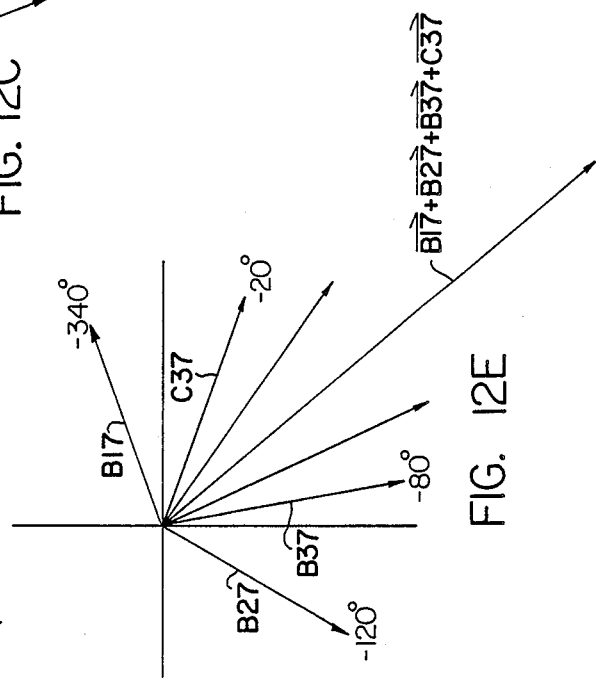

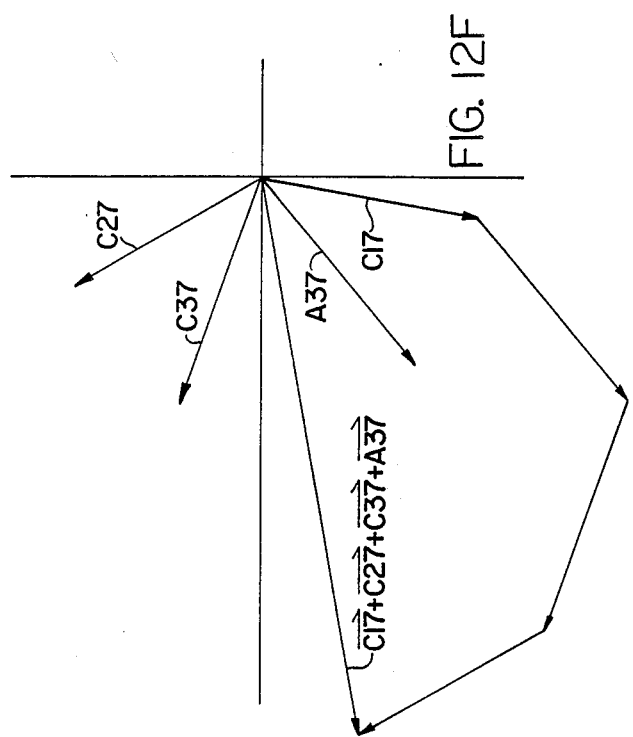

HARMONIC REDUCTION FOR MULTI-BRIDGE CONVERTERS

BACKGROUND OF THE INVENTION

The present invention relates to harmonic signal reduction, and more particularly to harmonic signal reduction in the output fundamentals of a multi-bridge three-phase power supply.

Present day three-phase converter systems provide for two way conversion of electrical energy, selectably either from DC to AC or from AC back to DC, i.e. each converter functions alternately as an inverter (DC to AC) or a rectifier (AC to DC). As known, three-phase converters providing output power in excess of a few hundred kilowatts require the use of multiple converter bridges connected in parallel between the DC or AC sources and the load due to the limited power handling capability of individual bridges. When used as an inverter, each bridge provides at each of three-phase outputs, or poles, a square wave fundamental signal for each of the three output phases of the converter. The square wave fundamental signals from each bridge have a harmonic content which causes the power level of the bridge fundamental signals to change each time a pole switches. These harmonics may be determined from the Fourier series expansion for a square wave fundamental signal of frequency wt. as:

$$f(t) = \frac{4V}{\pi} \left[ SIN(wt + 0) + \frac{1}{3} SIN(3wt + 30) + \frac{1}{5} SIN(5wt + 50) \ldots \frac{1}{k} SIN(kw + K0) \right]$$

where V is the signal voltage magnitude and 0 the phase angle. Only odd harmonics are present in the expansion, and for a square wave fundamental signal measured between the output poles of the three-phase system there is inherent cancellation of the third harmonics and multiples thereof; i.e. triplens, such that the signal harmonics of the fundamental signal between pole outputs are odd harmonics less triplens, i.e. the 5, 7, 11, 13, 17, 19, 23, 25, 29, 31, 35, 37... etc.

As known to those skilled in the art, if two signals (current or voltage) are added to each other at an angle $360°/2N=180°/N$, the Nth harmonics of each signal are displaced from each other by $(180°/N) N = 180°$ and will cancel if the amplitudes of each are equal. If pairs of signals are added from two sets of P phase signals this angle becomes $360°/2PN=180°/PN$, or $60°/N$ for a three-phase system. This relationship is used in providing harmonic cancellation in a two-bridge three-phase inverter as disclosed by Udo H. Meier in U.S. Pat. No. 3,792,286, where various interconnection arrangements are illustrated for two-phase displaced bridges driving two equally displaced load windings, to provide cancellation of the 5th and 7th harmonics of the output fundamental. In the Meier patent the corresponding phase outputs of the two bridges are relatively phase displaced by 30° (360°/2PN, where P=3, N=2) and the load windings are similarly displaced to provide a unity power factor fundamental signal to the load. Cancellation of the 5th and 7th harmonics occurs, in a three-phase reactor connected to the phase outputs of each bridge, as a direct result of the summation of two (N=2) sets of three (P=3) phase corresponding fundamental signals separated relatively displaced in phase by the angle $360°/2PN=30°$. Cancellation for only two bridges is disclosed and any attempt to extend the teaching of Meier to inverters having more than two bridges results in the realization that the number of bridges must be limited to powers of two to allow for successive addition of pairs, then pairs of pairs and so on. Therefore, the next number of bridges required is four, with the signals of the second pair summed in a second reactor which cancels the 5th and 7th harmonics of the second pair, and with the outputs from each of the two reactors being summed in a third reactor which provides cancellation of the next two sets of higher order harmonics 11, 13, 17 and 19. Since it may be found practical to provide high power converters with as many as seven inverter bridges, Meier fails to teach a method or apparatus for cancelling the fundamental harmonics in a three, five, six or seven bridge converter system.

A second U.S. Pat. No. 3,876,923, to A. J. Humphrey et al provides an extension of the Meier teaching by disclosing the use of the Meier arrangement for a two inverter bridge system relatively displaced at the interpole angle of 30° and providing three-phase power through a similar reactor into a phase displaced load winding, which in Humphrey et al is disclosed as a combination of phase and auxiliary windings in a common magnetic circuit as opposed to the electrically isolated loads of Meier. As in Meier, there is no suggestion by Humphrey et al of a method or arrangement for cancelling the fundamental harmonics in an inverter system having non-power of two numbers of bridges.

U.S. Pat. No. 4,204,264 assigned to the same assignee as the present invention provides harmonic signal cancellation in an inverter system having non-power of two numbers of bridges wherein the fundamental signals of each bridge are phase displaced by 60°/N degrees relative to the fundamental signals provided at another bridge. The bridges are grouped and fundamental signals are produced for each group which have a phase angle corresponding to one of the converter phases. The signal harmonics in one group of an order less than (6N−1) displaced 180 degrees from the equal order signal harmonics of another group. The fundamental signals having corresponding phase angles are added and provide the output fundamental signal in each of the converter phases with the signal having a first harmonic of order (6N−1).

Each of the foregoing patents disclose methods and apparatus which attempt to cancel harmonic signals in the output fundamental signals of multi-bridge, three-phase power converters. Typically, such approaches require balanced circuit arrangements and equal bridge current magnitudes which necessitate exact ratios which are a funciton of transcendental functions. Thus, large turns transformers with only restricted integer windings can be used. These transformers are generally very expensive and add greatly to the cost of power converters having such harmonic signal cancellation circuits. In addition, it is necessary to use transformers that have low flux levels in order to keep power losses down.

The transformers in high power inverters have only a few turns per winding despite having input voltages of several hundred volts, and windings having only a 1 or 2 per cent to exact ratios are feasible without auxiliary auto-transformers. In addition, winding unbalance may produce a 1 to 2 per cent difference in bridge loadings. Therefore, balanced impedances or exact sharing is not feasible or practical in practice to achieve exact harmonic cancellation and bridge loading.

It is therefore a general aim of the present invention to provide harmonic signal reduction for multi-bridge converters that produces an output voltage having an acceptable total harmonic distortion and single harmonic distortion for use in high power converters.

It is a further aim of the present invention to provide apparatus for harmonic reduction in output fundamental signals of a multi-bridge, three-phase converter for any combination of odd or even numbers of bridges.

SUMMARY OF THE INVENTION

In accordance with the present invention, harmonic signal reduction in the output fundamental signals of a multi-bridge, three-phase converter connects the outputs of the bridges to matching displaced windings on the output transformer through current balancing series transformers. The current balancing transformers provide the proper phasing of the bridge currents to cause them to have substantially the same power factor. The outputs of two adjacent bridges are combined and then the combined output is combined with the output of a next bridge to provide a second combined output which is in turn combined with the output of a next bridge. The combinations are expandable to cover any even or odd numbers of bridges.

BRIEF DESCRIPTION OF THE DRAWINGS

Other features and advantages of the present invention will become readily apparent from the following written description taken in conjunction with the following drawings wherein:

FIGS. 3A–3E are vector illustrations of the fundamental signal waveforms used in the description of the embodiment of FIGS. 1 and 2.

FIGS. 4A–4E are vector illustrations of the 5th harmonic signals of the fundamental signals of FIGS. 3A–3E used in the description of the embodiments of FIGS. 1 and 2.

FIGS. 5A–5E are vector illustrations of the 7th harmonic signals of the fundamental signals of FIGS. 3A–3E used in the description of the embodiment of FIGS. 1 and 2.

FIGS. 6A–6E are vector illustrations of the 11th harmonic signals of the fundamental signals of FIGS. 3A–3E used in description of the embodiment of FIGS. 1 and 2.

FIGS. 7A–7E are vector illustrations of the 13th harmonic signals of the fundamental signals of FIGS. 3A–3E used in description of the embodiment of FIGS. 1 and 2.

FIGS. 10A–10I are vector illustrations of the fundamental signal waveforms used in the description of the embodiment of FIGS. 8 and 9.

FIGS. 11A–11F are vector illustrations of the 5th harmonic signals of the fundamental signals of FIGS. 10A–10I used in the description of the embodiment of FIGS. 8 and 9.

FIGS. 12A–12F are vector illustrations of the 7th harmonic signals of the fundamental signals of FIGS. 10A–10I used in the description of the embodiment of the FIGS. 8 and 9.

DETAILED DESCRIPTION OF PREFERRED EMBODIMENTS

Figure 1:
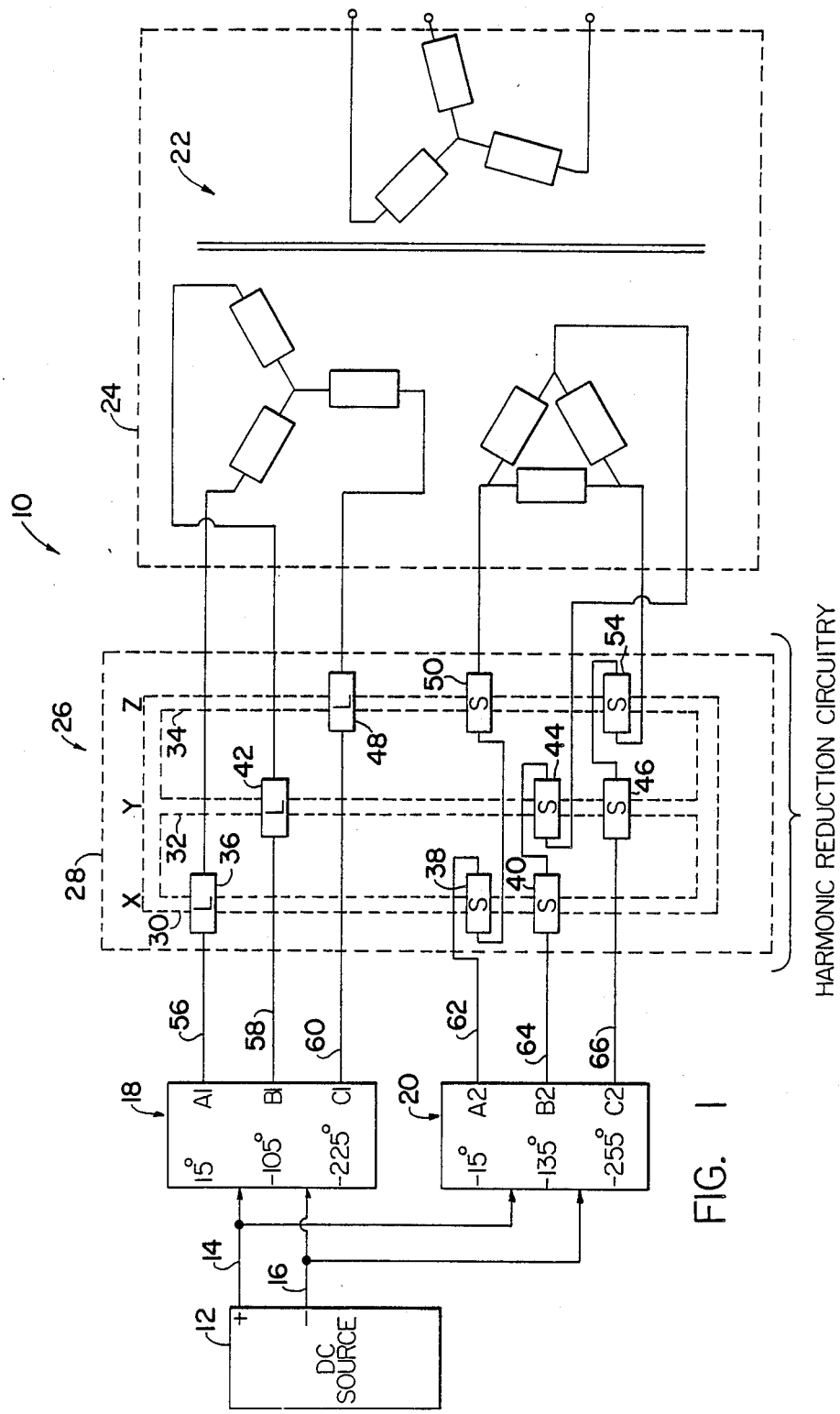
FIG. 1 is a schematic block diagram illustration of one embodiment of harmonic reduction apparatus according to the present invention for use with a three-phase, two-bridge converter.
Figure 2:
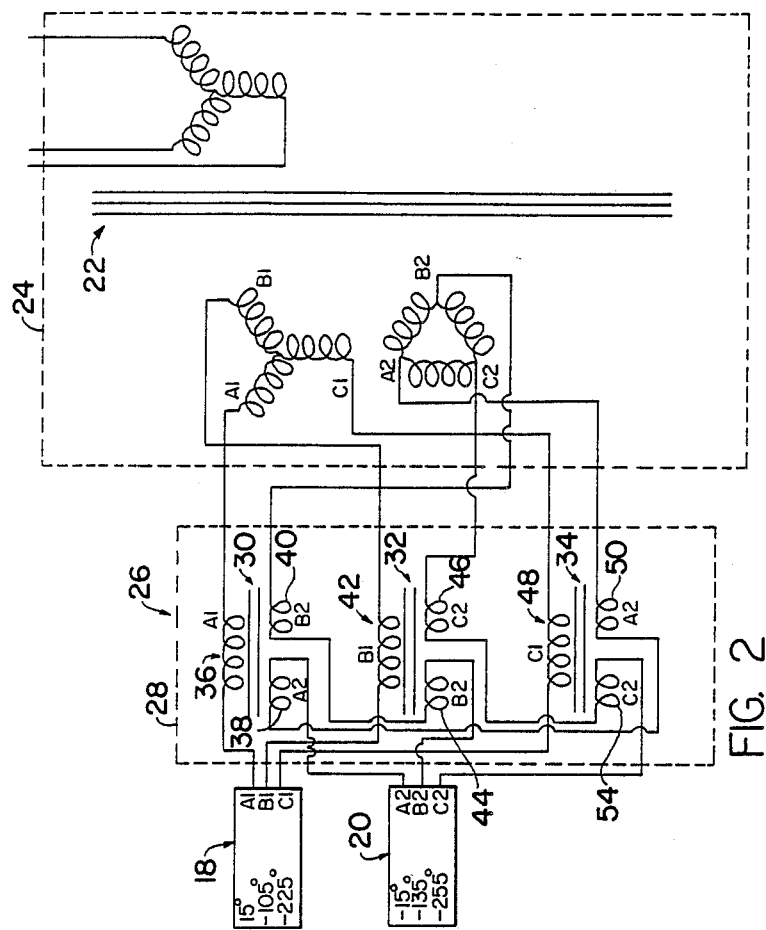
FIG. 2 is a representative circuit schematic for the harmonic reduction apparatus illustrated in FIG. 1.

Referring now to the Figures and considering FIGS. 1 and 2, an embodiment of harmonic frequency reduction apparatus according to the present invention for a three phase, two bridge converter providing DC to AC conversion, i.e. inverter function is illustrated therein. The converter, generally designated 10, receives DC electrical power from a DC voltage source 12 connected positively and negatively through leads 14, 16 to inputs of two parallel inverter bridges functionally illustrated and generally designated 18, 20 respectively. Each bridge has three phase outputs, or pole outputs, A, B and C, relatively phase displaced in a closed sequence by 120° (360°/P), each at a phase angle corresponding to one of the three converter output phases. In the absence of harmonic signal reduction circuitry, the bridge phase outputs are coupled directly to associated phases of an output transformer generally designated 22 and shown within the dashed line box 24. The transformer 22 is of the Delta-Wye type which provides a summation of each three fundamental signals of the corresponding phase outputs of the bridges 18, 20 to provide a sum fundamental signal as the output signal in each converter phase. In the present invention, harmonic signal reduction circuitry generally designated 26 within the dashed line box 28 is interconnected between the bridge phase outputs and the primary windings of the output transformer 22 to provide the harmonic signal reduction prior to signal transfer through the output transformer 22.

The converter bridges 18, 20 are of a type well known to those skilled in the art and a detailed description of their operation is not necessary for an understanding of the present invention. Reference may be had to the above-referenced U.S. Pat. No. 4,204,264 for a more detailed description of the bridges 18, 20 and which disclosure is incorporated herein by reference.

In the embodiments illustrated in FIGS. 1 and 2, the bridge output signals are assumed not to be pulse modulated, such that the phase output fundamental signals are substantially square waves. This assumption provides a simplification of the description and analysis of the harmonic signal reduction of the present invention, but in no way limits the invention to inverters providing only square wave pole output signals. As is well known to those skilled in the art, pulse modulation is used to reduce harmonics of the fundamental as well as to provide for voltage regulation and may be used in combination with the harmonic signal reduction of the present invention and in fact may be used to reduce the 5th and 7th harmonic components and to minimize transformer size.

Again, referring to FIGS. 1 and 2, the corresponding phase outputs ($A_1$, $A_2$, and $B_1$, $B_2$, and $C_1$, $C_2$) are phase displaced to provide a relative phase displacement of $\theta = 360°/2PN = 30°$.

The phase outputs of the two bridges 18, 20 are connected to the harmonic signal reduction circuitry 26 which includes a phase shifting transformer shown within the dashed 32 and 34, respectively each phase displaced from the other in a closed sequence by 120°. The phase shifting transformer 28 includes a set of three windings 36, 38 and 40 on the core leg 30, windings 42, 44, 46 on leg 32 and windings 48, 50 and 52 on leg 34.

The windings 36, 42 and 48 are long windings (L) and windings 38, 40, 44, 46, 50 and 54 are short windings (S) and each L winding is associated with a pair of S windings. An S winding is electrically connected in series opposing with another S winding as illustrated in FIGS. 1 and 2. The individual L and S windings are connected to selected phase outputs from each of the pair of bridges 18, 20 to provide zero fundamental signal ampere turns within the transformer three-phase core.

In FIGS. 1 and 2, the phase outputs of the bridge 18, 20 are connected through the lines 56-66 to selected windings on the legs of the transformer 28 as illustrated. The S/L turns ratio is calculated to provide zero ampere turns in the transformer core for the displaced fundamental signals such that the leg 30 has its L winding 36 connected through line 56 to the corresponding phase output $A_1$ and S windings 38, 40 connected through lines 62, 64 respectively to the corresponding phase outputs $A_2$, $B_2$. The S winding 38 is poled to provide opposite phasing with respect to the windings 36 and 40 which are also wound on the leg 30.

Likewise, the leg 32 has its L winding 42 connected through line 58 to the corresponding phase output $A_2$ and S Likewise, the leg 32 has its L winding 42 connected through line 58 to the corresponding phase output $A_2$ and S windings 44, 46 connected through lines 64, 66 respectively to the corresponding phase outputs $B_2$, $C_2$. The S winding 44 is poled to provide opposite phasing with respect to the windings 42 and 46 which are also wound on the leg 32.

The leg 34 also is wound similarly with its L winding 48 connected through line 60 to the phase output $C_2$ and S windings 50, 54 connected through lines 62, 66 respectively to the corresponding phase outputs $A_2$, $C_2$ with the S winding 54 poled to provide the opposite phasing.

FIGS. 3A and 3B illustrate the displaced fundamental signals presented through the lines 56-66 to the transformer 28, each with a power factor of cos 15°. The kilowatt (KW) current ($I_o$) and voltage ($V_o$) of each is equal to I cos 15° and V cos 15°, where I and V are current and voltage magnitudes for a nondisplaced fundamental.

In FIG. 3C, the voltages developed in the leg 30 of the transformer 28 are illustrated for the fundamental signal. The output fundamental voltage signal shown as the vector $A_{11}$ is summed with the voltage signals shown as the vector $-A_{21}$ (opposite phasing of winding 38) and $B_{21}$ where the sum is illustrated as the vector 31 which is equal in magnitude but 180° out of phase with the fundamental voltage signal $A_{11}$ thereby passing the fundamental signal unattenuated to the output transformer 22.

In FIG. 3D, the voltages developed in the leg 32 are illustrated for the fundamental signal. The output fundamental voltage signal shown as the vector $B_{11}$ is summed with the voltage signals shown as the vectors $-B_{21}$ (opposite phasing of winding 44) and $C_{21}$ where the sum is illustrated as the vector 33 which is equal in magnitude but 180° out of phase with the fundamental voltage signal $B_{11}$ thereby passing the fundamental signal unattenuated to the output transformer 22.

In FIG. 3E, the voltages developed in the leg 34 are illustrated for the fundamental signal. The output fundamental voltage signal shown as the vector $C_{11}$ is summed with the voltage signals shown as the vectors $-C_{21}$ (opposite phasing of winding 54) and $A_{21}$ where the sum is illustrated as the vector 35 which is equal in magnitude but 180° out of phase with the fundamental voltage signal $C_{11}$ thereby passing the fundamental signal unattenuated to the output transformer 22.

FIGS. 4A and 4B illustrate the displaced fifth harmonic signals presented through the lines 56-66 to the transformer 28. In FIG. 4C, the voltages developed in leg 30 of the transformer 28 are illustrated for the fifth harmonic signal. The output fifth harmonic voltage signal is shown as the vector $A_{15}$ summed with the voltage signals shown as the vectors $-A_{25}$ and $B_{25}$ where the sum is illustrated as the vector 37 which is substantially equal to and in phase with the fifth harmonic signal such that substantially all of the fifth harmonic voltage signal is dropped across the transformer 28 rather than passed to the output transformer 22.

In FIG. 4D, the voltages developed in leg 32 of the transformer 28 are illustrated for the fifth harmonic signal. The output fifth harmonic voltage signal is shown as the vector $B_{15}$ summed with the voltage signals shown as the vectors $-B_{25}$ and $C_{25}$ where the sum is illustrated as the vector 39 which is substantially equal to and in phase with the fifth harmonic voltage signal such that substantially all of the fifth harmonic voltage signal is dropped across the transformer 28 rather than passed to the output transformer 22.

In FIG. 4E, the voltages developed in the leg 32 of the transformer 28 are illustrated and as above, the output fifth harmonic voltage signal is shown as the vector $C_{15}$ summed with the voltage signals shown as the vectors $-C_{25}$ and $A_{25}$ where the sum is illustrated as the vector 41 which is substantially equal to and in phase with the fifth harmonic signal such that substantially all of the fifth harmonic voltage signal is dropped across the transformer 28 rather than passed to the output transformer 22.

The voltages developed in the transformer 28 for the seventh harmonic voltage signal are illustrated in FIGS. 5A-5E. As in the case of the fifth harmonic voltage signals described above, the seventh harmonic voltage signals are also attenuated with the harmonic reduction apparatus of the present invention.

The eleventh and thirteenth harmonic signals are, as is the fundamental frequency voltage signal, passed unattenuated to the output transformer 22. FIGS. 6A-6B illustrate the output eleventh harmonic voltage signals and FIGS. 6C-6E illustrate as vectors the eleventh harmonic voltage signals developed across the legs of the transformer 28. FIGS. 7A-7B illustrate the output thirteenth harmonic voltage signals and FIGS. 7C-7E illustrate as vectors the thirteenth harmonic voltage signals developed across the legs of the transformer 28.

It can be shown that the 17, 19, 29, 31, etc. harmonic voltage signals are reduced as demonstrated above for the fifth and seventh harmonic voltage signals. It can also be shown that the 23, 25, 35, 37, etc. harmonic voltage signals are passed unattenuated as demonstrated above for the fundamental, eleventh and thirteenth harmonic voltage signals.

Figure 8:
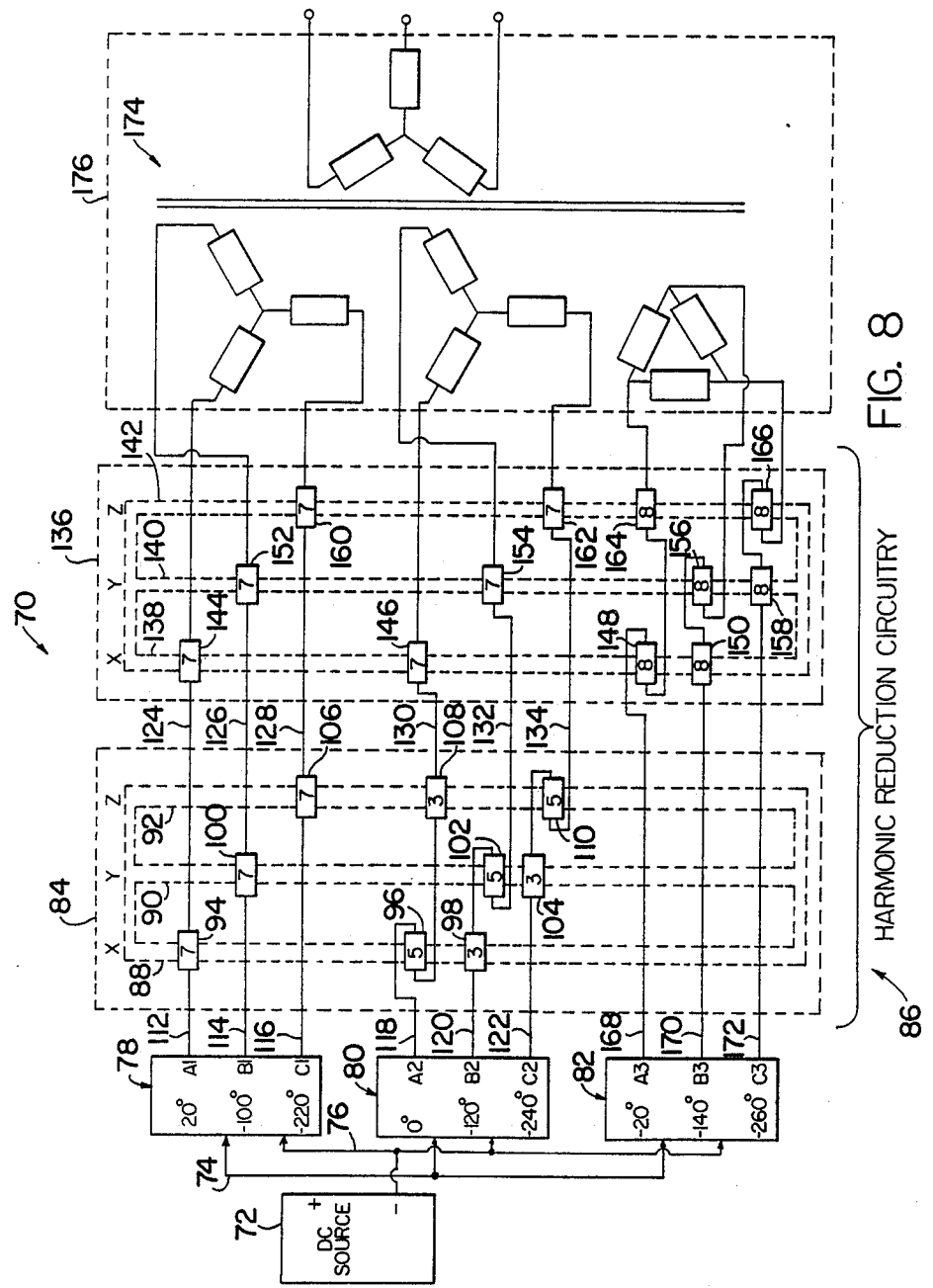
FIG. 8 is a schematic block illustration of another embodiment of harmonic reduction apparatus according to the present invention for use with a three-phase, three-bridge converter.
Figure 9:
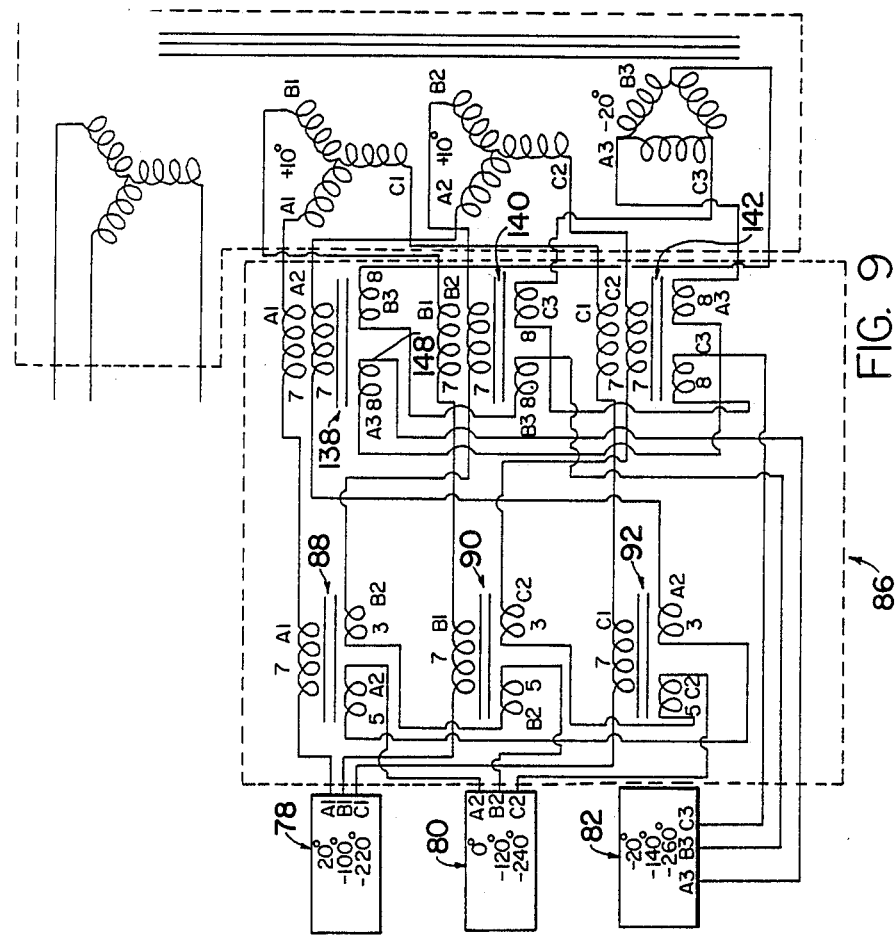
FIG. 9 is a representative circuit schematic for the harmonic reduction apparatus illustated in FIG. 8.

Referring to FIGS. 8 and 9, the harmonic reduction apparatus embodying the present invention is illustrated as used with a three bridge configuration wherein the phase outputs of two adjacent bridges are combined and then combined with the output of the third bridge. Again, the bridge output signals are assumed not to be pulse modulated such that phase output fundamental signals are substantially square waves.

Referring to FIGS. 8 and 9, a three bridge converter providing DC to AC conversion is illustrated therein and generally designated 70. A DC voltage source 72 is connected positively and negatively through leads 74, 76 to inputs of three parallel inverter bridges functionally illustrated and generally designated 78, 80 and 82, respectively. The corresponding phase outputs ($A_1$, $A_2$, $A_3$ and $B_1$, $B_2$, $B_3$ and $C_1$, $C_2$ and $C_3$) are phase displaced to provide a relative phase displacement of $0 = 360°/2PN = 20°$.

The phase output of the two bridges 78, 80 are connected to a phase shifting reduction transformer shown within the dashed line box 84 and which is part of the harmonic reduction circuitry generally designated 86 embodying the present invention. The phase outputs of the bridges 78 and 80 are connected through the lines 112–122 to the selected windings on the legs of transformer 84 as illustrated. The transformer 84 has a three-phase core of X, Y and Z legs, 88, 90 and 92 respectively, each phase displaced from the other in a closed sequence by 120°. The phase shifting transformer 84 includes a set of three windings 94, 96 and 98 on the core leg 88, windings 100, 102 and 104 on the leg 90 and windings 106, 108 and 110 on the leg 92. The transformation ratio of the windings of the transformer 84 are 7 to 5 to 3 as illustrated.

The outputs of the transformer 84 on the leads 124–134 are connected to a second phase shifting reduction transformer shown within the dashed line box 136 and which transformer has a three phase core of X, Y and Z legs, 138, 140 and 142 respectively, each phase displaced from the other in a closed sequence by 120°. The phase shifting transformer 136 includes a set of four windings 144, 146, 148 and 150 on the leg 138, windings 152, 154, 156 and 158 on the leg 140 and windings 160, 162, 164 and 166 on the leg 142. The transformer 136 combines the outputs from the transformer 84 and the phase outputs on the leads 168–172 of the bridge 82. The transformation ratio of the windings on each leg of the transformer 136 is 7 to 7 to 8 to 8.

The output signals from the transformer 136 are coupled to the associated phases of an output transformer generally designated 174 and is shown within the dashed line box 176. The transformer 174 is of the Delta-Wye type which provides a summation of each three fundamental signals of the corresponding phase outputs of the bridges 78, 80 and 82 to provide a sum fundamental signal as the output signal in each converter phase.

Figure 10C:
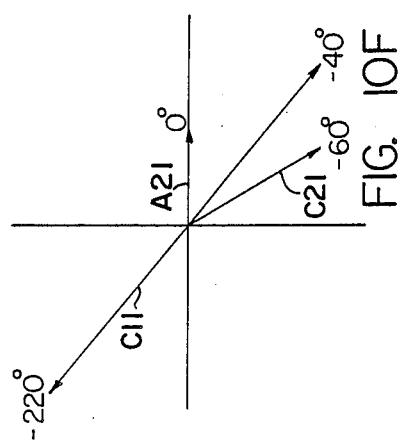
Figure 10F:
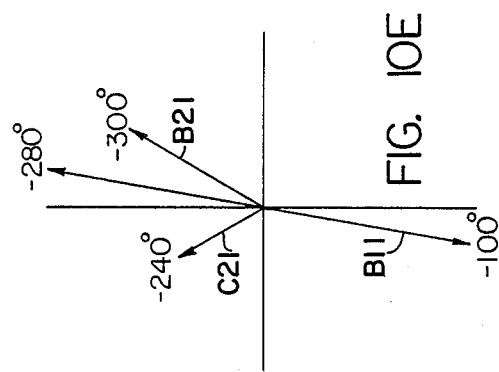
Figure 10B:
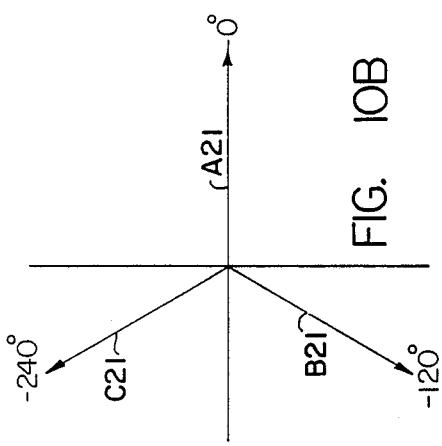
Figure 10E:
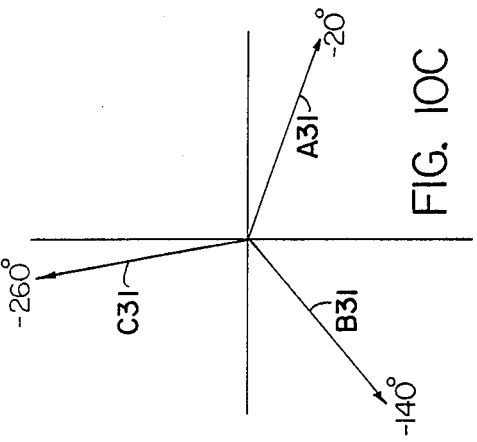
Figure 10A:
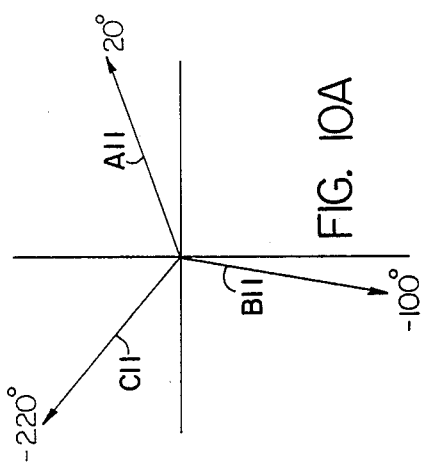
Figure 10D:
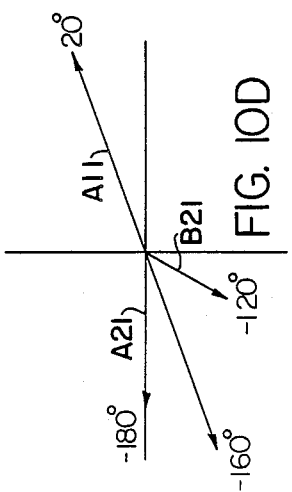

FIGS. 10A, 10B and 10C illustrate the displaced fundamental signals presented through the lines 112–122 and 168–172 to the transformer 84 and 136 respectively each with a power factor of cos 20°. In FIG. 10D, the voltages developed in leg 88 of the transformer 84 are illustrated for the fundamental signal. The output fundamental voltage signal shown as the vector $A_{11}$ is summed with the voltage signals shown as the vector $-A_{21}$ (opposite phasing of winding 96) and $B_{21}$ where the sum is illustrated showing that the fundamental signal is passed unattenuated to the transformer 136. Likewise, FIGS. 10E and 10F show respectively that the fundamental voltage signals represented by the vector $B_{11}$ and $C_{11}$ are likewise passed unattenuated to the transformer 136. FIGS. 10G, 10H and 10I illustrate the voltages developed in the legs 138, 140 and 142 respectively of the transformer 136 for the fundamental signal. The output fundamental voltage signal shown as the vectors $A_{11}$ and $A_{21}$ are summed with the voltage signals shown as the vectors $-A_{31}$ (opposite phasing of winding 148) and $B_{31}$ and illustrates that the fundamental signal is passed unattenuated to the output transformer 174. Likewise, the output fundamental voltage signals $B_{11}$, $B_{21}$, $C_{11}$ and $C_{21}$ are passed unattenuated to the output transformer 174.

FIGS. 11A–11F illustrate the displaced fifth harmonic signals presented through the lines 112–122 and 168–172 to the transformers 84 and 136 respectively. In FIG. 11A, the voltages developed in the leg 88 of the transformer 84 are illustrated for the fifth harmonic signal. The output fifth harmonic voltage signal is shown as the summation of vectors $A_{15}$–$A_{25}$ (opposite phasing of winding 96)+$B_{25}$ where the sum is illustrated as the vector 91 and which illustrates the fifth harmonic signal is dropped across the transformer which substantially attenuates any fifth harmonic voltage signal passed to the output transformer. Likewise, FIGS. 11B and 11C also illustrate that the fifth harmonic voltage signals are dropped across the transformer 84 and are substantially attenuated rather than being passed to the output transformer 174.

FIGS. 11D–11F illustrate the displaced fifth harmonic signals presented through the lines 124–134 as attenuated by the transformer 184 and through the lines 168–172 from bridge 82 and which signals are summed in the transformer 136. In FIG. 11D, the voltages developed in leg 138 of the transformer 136 are illustrated for the fifth harmonic signal. The output fifth harmonic voltage signal is shown as the summation of the vectors $A_{15}+A_{25}-A_{35}$ (opposite phasing of winding 148)+$B_{35}$. From FIG. 11D, it is seen that the transformer leg 138 supports a substantial portion of the fifth harmonic voltage signal and reductions of 95% or greater can be expected. FIGS. 11E and 11F also illustrate that the displaced fifth harmonic voltage signals are supported by the transformer legs 140 and 142 respectively such that any fifth harmonic signal reaching the output transformer 174 is significantly attenuated.

FIGS. 12A–12F illustrate the displaced seventh harmonic voltage signals presented through the lines 112–122 and 168–172 the transformers 84 and 136 respectively. In FIG. 12A, the voltages developed in leg 88 of the transformer 84 are illustrated for the seventh harmonic signal. The output seventh harmonic voltage signals is shown as the summation of the vectors $A_{17}+B_{27}-A_{27}$ (opposite phasing of winding 96) where the sum is illustrated as the vector 93 demonstrating that the transformer leg 88 supports a substantial portion of the seventh harmonic voltage signal. FIGS. 12B and 12C likewise illustrate that the transformer legs 90 and 92 respectively of the transformer 84 support the displaced seventh harmonic voltage signal sums.

FIGS. 12D–12F illustrate the displaced seventh harmonic voltage signals presented to the transformer 136 through the lines 124–134 of the transformer 84 and lines 168–172 of the bridge 82. The output seventh harmonic voltage signal is shown as the summation of the vectors $A_{17}+A_{27}-A_{37}$ (opposite phasing of winding 148)+$B_{37}$. From FIG. 12D it is seen that the seventh harmonic output voltage from the third bridge 82 is combined with the seventh harmonic voltage signals presented by the bridges 78 and 80 and are supported in the leg 138 of the transformer 136 thus, significantly attenuating any seventh harmonic voltage signal presented to the output transformer 174. FIGS. 12E and 12F likewise show the displaced seventh harmonic voltage signals supported in the respective legs 140, 142 of the transformer 136.

It can be shown that the voltage outputs due to the 11, 13, 23, 25, 29, 31 and higher harmonic multiples of [.(6m) (+/−) 1] harmonic pairs are significantly reduced by the harmonic reduction apparatus illustrated in FIGS. 8 and 9. It can also be shown that in addition to passing the fundamental signal unattenuated to the output transformer, the 17, 19, 35, 37 and higher harmonic multiples of the [(18m) (+/−) 1] harmonic pairs are also passed unattenuated.

The harmonic reduction apparatus described above and disclosed as embodied in a two and three bridge inverter configuration may be extended to any numbers of odd or even bridge configurations. In contrast to prior known designs, the present invention does not require the use of a balanced structure for equal inverter bridge loading. From a practical standpoint, balanced impedances or exact current sharing is not feasible and therefore, substantial size and cost savings are realized through harmonic signal reduction rather than exact cancellation and equal bridge loading. The number of windings on the phase shifting transformers and output transformers are minimized as is the size of the transformers. Therefore, the invention has been described by way of illustration rather than limitation.

I claim:

1. A method for reducing the signal harmonics of the output fundamental signals of a three-phase inverter, each output fundamental signal being produced as the sum of equal phase angle fundamental signals from one of N sets of corresponding phase outputs of an N number of inverter bridges, where N is an integer, said method comprising the steps of:

adjusting the phase angle of the fundamental signals to provide a phase displacement of the fundamental signals of each inverter bridge by 60°/N relative to the fundamental signals provided at corresponding phase outputs of an immediately adjacent inverter bridge;

summing the phase displaced fundamental signals of the first and an immediately adjacent bridge of said N bridges by adding the phase output of the first bridge with the 180° out-of-phase signal of the corresponding phase output signal of the immediately adjacent bridge and the next immediately phase rotated signal of the immediately adjacent bridge to provide a first combined sum signal for each output fundamental signal for N=2 inverter bridges wherein the 6n+/−1 (where n=1, 3, 5,--) harmonic signal components are substantially reduced, and summing the phase displaced fundamental signals of the next immediately adjacent bridge of said N bridges and the sum of the phase displaced fundamental signals of the immediately preceding adjacent bridges by adding the phase outputs of the immediately preceding adjacent bridges with the 180° out-of-phase signal of the corresponding phase output signal of the next immediately adjacent bridge and the next immediately phase rotated signal of the next immediately adjacent bridge to provide a combined sum signal for each output fundamental signal for N>2 inverter bridges, wherein 6m+/−1 (where=1, 2, 4, 5,--) harmonic signal components are substantially reduced.

* * * * *

UNITED STATES PATENT AND TRADEMARK OFFICE
CERTIFICATE OF CORRECTION

PATENT NO. : 4,975,822
DATED : December 4, 1990
INVENTOR(S) : KENNETH LIPMAN It is certified that error appears in the above-identified patent and that said Letters Patent is hereby corrected as shown below:

Claim 1, column 10, line 35: "6m+/-1 (where=1, 2, 4, 5,--)" should be

--6m+/- 1 (where m = 1, 2, 4, 5,--).

Signed and Sealed this

Sixteenth Day of June, 1992

*Attest:*

DOUGLAS B. COMER

*Attesting Officer*     *Acting Commissioner of Patents and Trademarks*